US012566106B2

(12) United States Patent
Nobile et al.

(10) Patent No.: US 12,566,106 B2
(45) Date of Patent: Mar. 3, 2026

(54) MONITORING SYSTEM FOR MONITORING PARAMETERS REPRESENTATIVE OF OPERATING CONDITIONS OF AN OIL FILM BEARING

(71) Applicant: Danieli & C. Officine Meccaniche S.p.A., Buttrio (IT)

(72) Inventors: Matteo Nobile, Cervignano del Friuli (IT); Enrico Veronesi, Corno di Rosazzo (IT); Gianluigi Vitiello, Udine (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 240 days.

(21) Appl. No.: 18/263,101

(22) PCT Filed: Jan. 28, 2022

(86) PCT No.: PCT/IB2022/050744
§ 371 (c)(1),
(2) Date: Jul. 26, 2023

(87) PCT Pub. No.: WO2022/162596
PCT Pub. Date: Aug. 4, 2022

(65) Prior Publication Data
US 2024/0085272 A1 Mar. 14, 2024

(30) Foreign Application Priority Data
Jan. 29, 2021 (IT) ........................ 102021000001889

(51) Int. Cl.
*G01M 13/04* (2019.01)
*B21B 38/00* (2006.01)
*B21B 38/08* (2006.01)

(52) U.S. Cl.
CPC ........... *G01M 13/04* (2013.01); *B21B 38/006* (2013.01); *B21B 38/08* (2013.01)

(58) Field of Classification Search
CPC ..... B21B 31/074; B21B 38/00; B21B 38/006; B21B 38/08; F16C 13/02; F16C 17/02;
(Continued)

(56) References Cited

U.S. PATENT DOCUMENTS 3,052,123 A * 9/1962 Gustafson ............. F16C 37/002
374/185
4,376,389 A * 3/1983 Inoue ...................... F16N 29/00
702/183
(Continued)

FOREIGN PATENT DOCUMENTS

CN 102944351 A 2/2013
CN 104114885 A 10/2014
(Continued)

OTHER PUBLICATIONS

Patent Cooperation Treaty, International Search Report and Written Opinion for International Application No. PCT/IB2022/050744, Apr. 21, 2022, 12 pages.
(Continued)

*Primary Examiner* — Alexander A Mercado
(74) *Attorney, Agent, or Firm* — Stetina Garred Brucker Newboles

(57) ABSTRACT

A system for monitoring the parameters representative of operating conditions of an oil film bearing, wherein an oil film is arranged between a static component and at least one rotating component defining an axis, said at least one rotating component being arranged inside said static component, the system comprising
at least one pressure sensor to detect the oil pressure of said oil film;
(Continued)

at least one distance sensor to detect the thickness of said oil film;

at least one temperature sensor to detect the temperature of said oil film;

wherein the at least one pressure sensor, the at least one distance sensor, and the at least one temperature sensor are housed in said at least one rotating component.

14 Claims, 2 Drawing Sheets

(58) Field of Classification Search
CPC .... F16C 17/24; F16C 17/243; F16C 33/1025; F16C 33/105; F16C 2233/00; F16C 2233/12; G01B 7/14; G01M 13/04
See application file for complete search history.

(56) References Cited

U.S. PATENT DOCUMENTS

| | | | | | |
|---|---|---|---|---|---|
| 4,406,169 A | * | 9/1983 | Ikeuchi | ................... | F16C 17/24 |
| | | | | | 73/862.541 |
| 4,944,609 A | * | 7/1990 | Salter, Jr. | ................ | F16C 13/02 |
| | | | | | 384/118 |

| | | | | | |
|---|---|---|---|---|---|
| 2012/0068460 A1 | * | 3/2012 | Wadehn | .............. | F16C 33/1075 |
| | | | | | 290/44 |
| 2017/0122838 A1 | | 5/2017 | Ko et al. | | |
| 2021/0372478 A1 | * | 12/2021 | Ciciriello | ................ | F16C 17/02 |

FOREIGN PATENT DOCUMENTS

| | | | | | | |
|---|---|---|---|---|---|---|
| CN | 106500860 | A | | 3/2017 | | |
| CN | 206440462 | U | * | 8/2017 | | |
| CN | 107262553 | A | | 10/2017 | | |
| CN | 112129532 | A | * | 12/2020 | ........... | G01M 13/04 |
| DE | 2501956 | A1 | | 7/1975 | | |
| DE | 102017223390 | A1 | * | 6/2019 | ......... | F16C 33/1055 |
| JP | S5813221 | A | | 1/1983 | | |
| JP | S5828607 | A | | 2/1983 | | |
| JP | 59097316 | A | | 6/1984 | | |
| JP | H1172398 | A | | 3/1999 | | |
| WO | WO-2019120870 | A1 | * | 6/2019 | ......... | F16H 57/0479 |

OTHER PUBLICATIONS

Office Action for Japanese Patent Application No. 2023-544260; mailed Feb. 21, 2025.

First Examination Opinion Notice for Chinese Application No. 202280011918.9; mailed Dec. 8, 2025.

* cited by examiner

MONITORING SYSTEM FOR MONITORING PARAMETERS REPRESENTATIVE OF OPERATING CONDITIONS OF AN OIL FILM BEARING

CROSS-REFERENCE TO RELATED APPLICATIONS

This application claims priority to PCT International Application No. PCT/IB2022/050744 filed on Jan. 28, 2022, which applications claims priority to Italian Patent Application No. 102021000001889 filed on Jan. 29, 2021, the entire disclosures of which are expressly incorporated herein by reference.

STATEMENT RE: FEDERALLY SPONSORED RESEARCH/DEVELOPMENT

Not Applicable

BACKGROUND

Field of the Invention

The invention relates to a monitoring system of an oil film bearing, e.g., provided in a rolling mill stand or roll casting device or coil forming system.

Background Art

The rolls are supported by bearings in the rolling mill stands for sheets and strips, as well as in other similar applications (e.g., continuous roll casting devices, profile product rolling mills, coil forming systems).

One of the main technologies used for these bearings is the oil film solution, in which a shaft, most often covered by a replaceable sleeve, rotates inside a static bushing.

To limit friction and wear between the parts, an amount of oil is injected between the bushing and the sleeve to create a layer of oil capable of reducing or almost eliminating friction and preventing massive contact between the two parts subject to relative motion.

In principle, it is understood that this rotation is free of friction and wear, and the shaft is coaxial to the bushing which acts as a guiding element. Actually, friction and wear are minimized but are still present, and a shaft deformation and a related displacement with respect to the bushing are possible, determining working conditions which create wear on the parts. Furthermore, these conditions can create a non-uniform distance between the shaft and the bushing, pressure peaks, and oil heating. Therefore, the temperature, pressure and thickness of the oil film vary in the gap between the two components in response to load, rotation speed, and other operating conditions.

At present, these conditions are mainly predicted with some approximation by a theoretical or empirical model, and their evaluation makes it possible to estimate the load on the parts, the residual wear, and the bearing life.

Disadvantageously, the level of prediction is not sufficient to anticipate premature and occasional failures or to determine the actual achievable performance, due to the low accuracy of the prediction but also to the variability of the working conditions.

Having the ability to estimate the oil film operating conditions in the field could reduce uncertainty and allow for improved prediction accuracy, eliminating uncertainties about actual operating conditions, with the beneficial effect of improving the performance and life of the bearing, and improving operating practices to optimize the bearing behavior.

The need is thus felt to make a monitoring system of the operating conditions of an oil film bearing capable of overcoming the aforesaid drawbacks.

SUMMARY OF THE INVENTION

It is an object of the present invention to make a novel solution for a more efficient monitoring of operating conditions in an oil film bearing.

It is a further aim of the present invention to provide a monitoring system which allows the continuous monitoring of three parameters inherent in oil film bearings: pressure, temperature, and layer thickness of the lubricating oil injected between shaft and bushing or between shaft sleeve and bushing.

The present invention achieves these and other purposes, which will be apparent in light of the present description, by means of a system for monitoring parameters representative of the operating conditions of an oil film bearing according to claim 1, wherein an oil film is present between a static component and at least one rotating component both defining an axis, said at least one rotating component being arranged inside said static component, the monitoring system comprising at least one pressure sensor to detect the oil pressure of said oil film;

at least one distance sensor to detect the distance between said static component and said at least one rotating component and thereby the thickness of said oil film;

at least one temperature sensor to detect the temperature of said oil film;

wherein the at least one pressure sensor, the at least one distance sensor, and the at least one temperature sensor are housed in said at least one rotating component.

Therefore, the solution makes it possible to map the three main parameters: oil film temperature, oil film thickness, and oil pressure.

Advantageously, the three types of sensors are installed in the rotating shaft, or in the sleeve attached to it, instead of on the static housing.

Advantageously, since the sensors can rotate together with the rotating component, the aforesaid three parameters of the oil film can be measured in different areas and mapping can be achieved.

With the solution of the invention, these three parameters can be measured for each point of the oil film along one or more circumferences having substantially the center on the axis X and being arranged spaced apart, in particular along the width of the bearing (parallel to the axis X, FIG. 1), to allow a correct reconstruction of the real working conditions, but also of possible deformations of the shaft inside the bearing, which are often unpredictable but can appreciably affect the local stresses on the mechanical components, thus causing damage and wear.

Three types of sensors can be used to measure, for example, temperature, pressure and thickness of the oil film at the same time:

a set of pressure sensors, such as piezoresistive sensors or other suitable sensors, which can produce an electrical signal based on the applied pressure;

a set of temperature sensors, such as thermocouples or other suitable sensors, which can produce an electrical signal based on the measured temperature;

a set of distance sensors, such as inductive sensors or
other suitable sensors, capable of reading the distance
between the bushing and the sleeve, or between the
bushing and the shaft, in the presence of an oil gap
between them.

Advantageously, a monitoring system according to the
invention makes it possible to obtain a correct mapping of
the aforementioned three parameters, at high resolution,
using a reduced number of sensors, unlike other possible
monitoring systems in which high numbers of sensors are
installed in the static part of the bearing to simplify supply-
ing power to them, and the sensors monitor only one of the
mentioned parameters.

Instead, in the present invention, the sensors are mounted
on the sleeve, if present, or directly on the shaft, so that, for
example, a single row of sensors with two or more sensors,
can be installed for each type of sensor with appropriate
spacing in the axial direction. Thus, a regular measurement
grid is obtained due to the rotation imposed on the shaft.

Alternatively, only one sensor can be provided per sensor
type.

The sensors can be powered by sliding contacts, batteries,
wirelessly, or otherwise, such as by a device equipped with
an alternator and a flywheel. In this manner, existing instal-
lations can also be conditioned without complex technical
interventions.

Some advantages of the solution of the present invention
over the prior of the art are listed below:
efficient monitoring of the bearing operating conditions;
possibility of anticipating possible accidents, and thus
reducing accidents;
possibility of leaving the bearings in operation beyond the
conventional operating hours if the measured condi-
tions are favorable;
cost reduction;
possibility of monitoring the aforesaid three parameters
independently;
possibility of installation on existing machines without
generation of new encumbrances.

The invention further relates to a rolling mill stand
according to claim 11; a continuous roll casting device
according to claim 12; and a coil forming system according
to claim 13.

Further features and advantages of the invention will be
more apparent in light of the detailed description of the
preferred, but not exclusive embodiments.

The dependent claims describe particular embodiments of
the invention.

BRIEF DESCRIPTION OF THE FIGURES

The description of the invention refers to the accompa-
nying drawings, which are provided by way of non-limiting
example, in which.

The same elements or components are referred to using
the same reference numerals.

Figure 1:
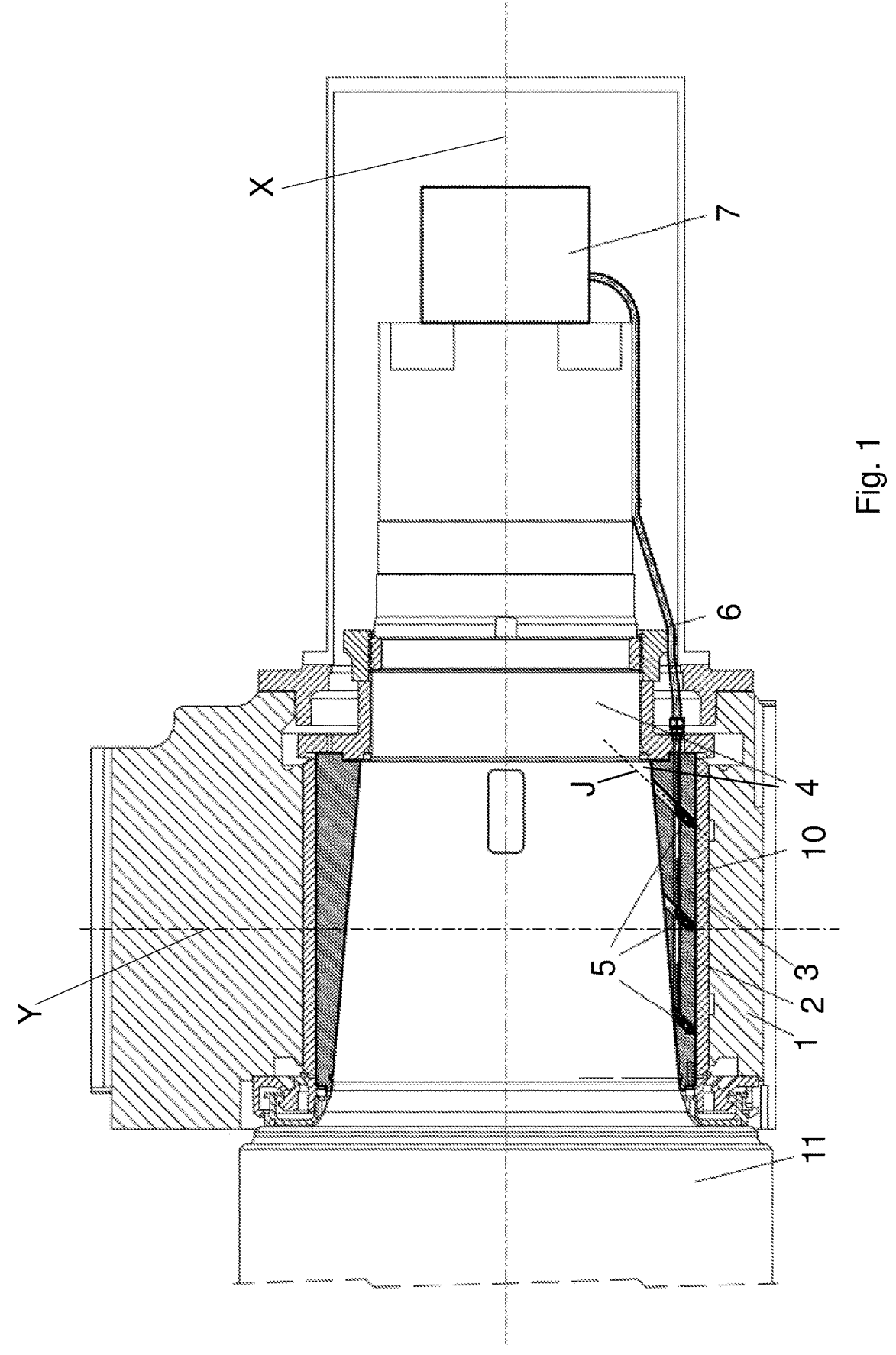
FIG. 1 shows a section view of a monitoring system
according to the invention.
Figure 2:
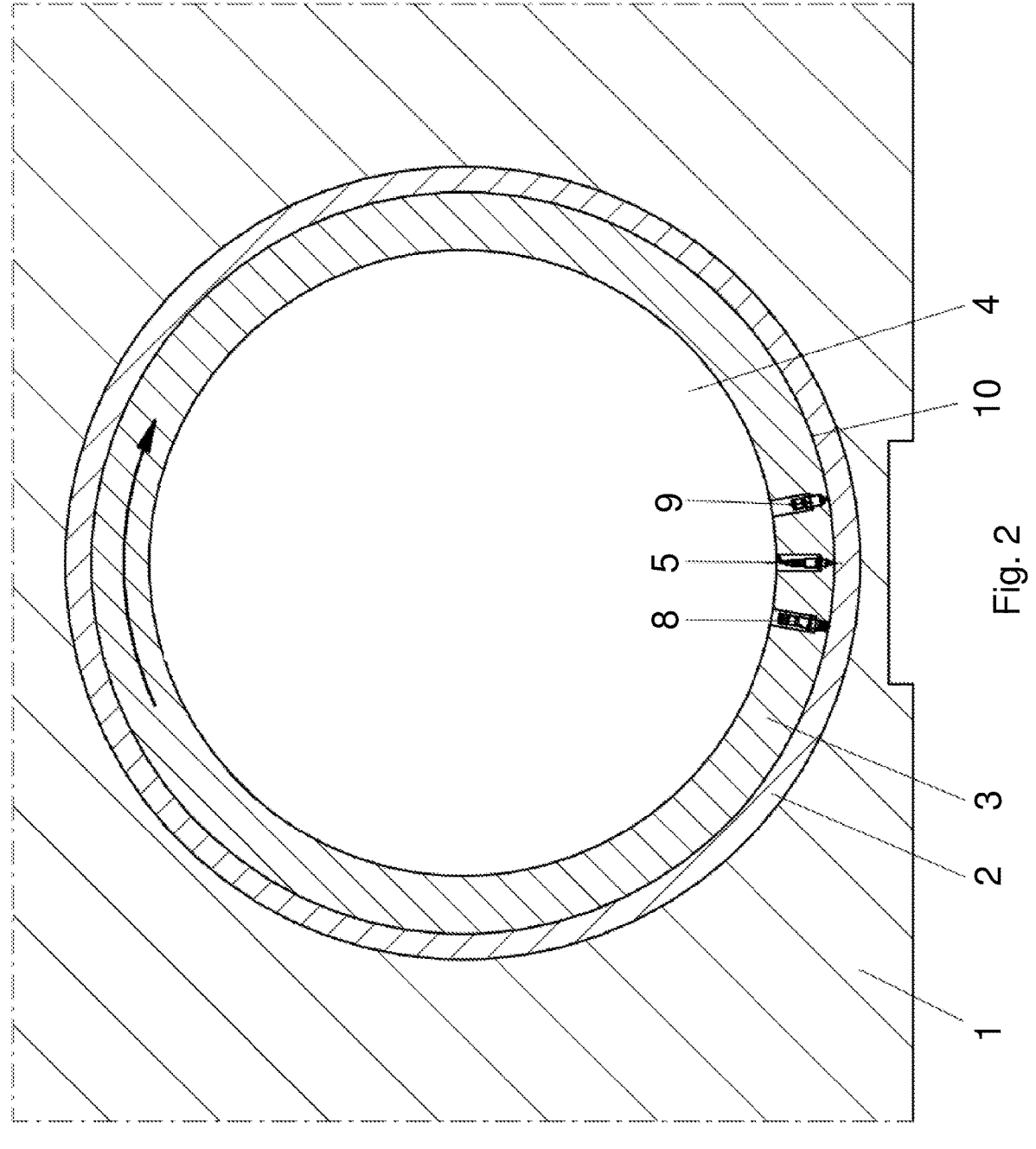
FIG. 2 show a section view taken along a plane vertical
and perpendicular to the sheet of FIG. 1.

DETAILED DESCRIPTION OF SOME
EMBODIMENTS OF THE INVENTION

Exemplary embodiments of a monitoring system accord-
ing to the invention are described with reference to the
figures.

4

The monitoring system can advantageously be used, in
particular it can be implemented, e.g., in a rolling mill stand,
in a continuous roll casting device, or in a coil forming
system.

The monitoring system is used, in particular, for moni-
toring the parameters representative of operating conditions
of an oil film bearing, wherein an oil film is arranged
between a static component 2 and at least one rotating
component 3, 4 defining an axis X, said at least one rotating
component 3, 4 being arranged inside said static component
2.

The term "rotating component" in particular refers to a
component which is capable of rotation, i.e., a rotatable
component. More in particular, the component is capable of
rotating about the axis X.

The term "static component" in particular means a com-
ponent which remains fixed in position, in particular during
rotation of the rotating component.

In all embodiments, the monitoring system comprises:
at least one pressure sensor 5 to detect the oil pressure of
said oil film;
at least one distance sensor 8 to detect the distance
between said static component 2 and said
at least one rotating component 3, 4 and thus the thickness
of said oil film;
at least one temperature sensor 9 to detect the temperature
of said oil film.

Advantageously, the at least one pressure sensor 5, the at
least one distance sensor 8 and the at least one temperature
sensor 9 are housed in said at least one rotating component
3, 4.

In particular, said at least one pressure sensor 5, said at
least one distance sensor 8 and said at least one temperature
sensor 9 are housed in said at least one rotatable component
3, 4 so as to be able to rotate together with said at least one
rotatable component 3, 4, e.g., so as to be able to rotate
integrally with said at least one rotatable component 3, 4.

Advantageously, when each sensor 5, 8, 9 makes a full
rotation about the axis X, a measurement of the parameter
detected by the sensor along the circumference it has trav-
eled can be obtained. Therefore, advantageously, each sen-
sor 5, 8, 9 can detect the respective parameter at different
angular positions.

Preferably, each sensor 5, 8, 9 is arranged in a peripheral
zone of the rotating component 3, 4.

Preferably, but not exclusively, part of each sensor 5, 8, 9
defines a portion of the periphery of the rotating component
3, 4. The periphery of the rotating component 3, 4 is the
portion of the rotating component 3, 4 proximal to the static
component 2.

Said at least one pressure sensor 5, said at least one
distance sensor 8, and said at least one temperature sensor 9
are preferably arranged in one or more holes or cavities of
said at least one rotating component 3, 4.

Preferably, each hole or cavity is appropriately plugged to
prevent unwanted infiltration of oil. For example, each hole
or cavity can be plugged by a respective sensor 5, 8, 9 and/or
by sealing means.

In particular, the wall which delimits each hole or cavity
extends about a respective axis J (one of which is shown in
FIG. 1), which is preferably transverse to the axis X.
Preferably, said axes J of the holes or cavities are mutually
parallel. In a first variant, the axes J of the holes, or cavities,
are perpendicular to the axis X, whereby the sensors are
arranged radially with respect to the axis X.

In a second variant each of said axes J of holes, or cavities, forms an angle other than 90° with respect to the axis X, whereby the sensors are not arranged radially with respect to the axis X.

Preferably, said at least one pressure sensor 5 is housed in a first hole or cavity obtained in said at least one rotating component 3, 4; said at least one distance sensor 8 is housed in a second hole or cavity obtained in said at least one rotating component 3, 4; and said at least one temperature sensor 9 is housed in a third hole or cavity obtained in said at least one rotating component 3, 4. In particular, the first hole, or cavity, the second hole, or cavity, and the third hole, or cavity, are mutually distinct.

Alternatively, two of either the at least one pressure sensor 5, the at least one distance sensor 8 or the at least one temperature sensor 9 are housed in a first hole or cavity obtained in said at least one rotating 3, 4, and the other one is housed in a second hole or cavity obtained in said at least one rotating component 3, 4. For example, one or more pressure sensors 5 and one or more distance sensors 8 are housed in the first hole or cavity; and one or more temperature sensors 9 are housed in the second hole or cavity.

Alternatively, the at least one pressure sensor 5, the at least one distance sensor 8, and the at least one temperature sensor 9 are housed in a single hole or cavity obtained in said at least one rotating component 3, 4. For example, a pressure sensor 5, a distance sensor 8, and a temperature sensor 9 can be arranged in a same hole or cavity. For example, two or more holes, or cavities, can be provided, in each of which a pressure sensor 5, a distance sensor 8, and a temperature sensor 9 are housed.

Preferably, two or more pressure sensors 5, two or more distance sensors 8, and two or more temperature sensors 9 are provided.

Preferably, the two or more pressure sensors 5 are axially separated from each other with respect to the axis X; and/or the two or more distance sensors 8 are axially separated from each other with respect to the axis X; and/or the two or more temperature sensors 9 are axially separated from each other with respect to the axis X.

Preferably, there are provided a row of pressure sensors 5, a row of distance sensors 8, and a row of temperature sensors 9, each row being arranged along a direction parallel to the axis X.

In other words, two or more pressure sensors 5 are arranged to form a row. In particular, the two or more pressure sensors 5 are aligned with each other, in particular along a direction parallel to the axis X. Similarly for the distance sensors 8 and the temperature sensors 9.

Advantageously, the three parameters can thus be measured at different positions along the axis X.

Preferably, the row of pressure sensors 5, the row of distance sensor 8, and the row of temperature sensors 9 are arranged along the periphery of said at least one rotating component 3, 4, preferably in a zone which corresponds to a convex central angle.

Preferably, the pressure sensors 5 are at a same distance from each other; the distance sensors 8 are at a same distance from each other; and the temperature sensors 9 are at a same distance from each other.

In a preferred variant, the distance between one pressure sensor 5 and the next is equal to both the distance between one distance sensor 8 and the next and the distance between one temperature sensor 9 and the next.

Preferably, each triad consisting of a pressure sensor 5, a distance sensor 8, and a temperature sensor 9 is arranged along a portion of circumference having its center on the axis X.

However, it is possible to provide only one pressure sensor 5, only one distance sensor 8, and only one temperature sensor 9, in particular arranged along the periphery of said at least one rotating component 3, 4, preferably in a zone which corresponds to a convex central angle. Preferably, this single triad of sensors 5, 8, 9 is arranged along a portion of a circumference having its center on the axis X.

In all the embodiments, the at least one pressure sensor 5, the at least one distance sensor 8, and the at least one temperature sensor 9 are connected by means of a respective cable 6, in particular an electrical cable, to a digitalization device 7. The digitalization device 7 is configured to digitize the signals generated by the respective sensors 5, 8, 9. Preferably, the digitalization device 7 is adapted to transmit the digitized signals either by means of a rotary joint, or wirelessly.

The digitalization device 7 preferably comprises a casing containing electronic hardware capable of amplifying and transforming, in particular digitizing, the signals of the sensors 5, 8, 9.

The digitalization device 7, in particular its casing, is preferably mounted on the rotating component 3, 4, in particular on the rotating component 4 which, for example, is a shaft pin. More in detail, the digitalization device 7 is preferably fixed to the rotating component 4 so that it can rotate therewith, e.g., integrally therewith.

Preferably, the digitalization device 7 is fixed to an axial end (axial relative to the axis X) of the rotating component 4. Preferably, the digitalization device 7 is arranged so as to be crossed by the axis X.

In all the embodiments, the at least one pressure sensor 5, the at least one distance sensor 8, and the at least one temperature sensor 9 can be powered by means of sliding contacts, batteries, wirelessly, or by means of a device provided with an alternator and a flywheel.

In particular, said device is fixed to the rotating component 4 so that it can rotate integrally therewith. The rotating component 4 and the device are arranged to be mutually coaxial (with respect to the axis X).

When the rotating component 4 rotates about the axis X, the flywheel is placed in rotation and, as it rotates, generates energy by means of the alternator. In this manner, the sensors 5, 8, 9 can be powered without the need for batteries.

The static component 2 is, for example, a bushing 2.

Said at least one rotating component 3, 4, for example, consists of a shaft pin 4 (or end pin) or a sleeve 3 into which a shaft pin 4 is inserted.

The shaft pin 4 is, for example, a neck or pin of a roll 11 of a rolling mill stand or continuous casting device or coil forming system.

In the illustrated example, said sensors 5, 8, 9 are housed in a sleeve 3. The oil film is present between the sleeve 3 and the bushing 2. In particular, the oil film is in contact with the sleeve 3 and the bushing 2. Preferably, the surface of the sleeve 3 and the surface of the bushing 2, between which the oil film is present, are cylindrical or substantially cylindrical.

A pin is inserted into the sleeve 3, in particular a shaft pin 4 or end pin.

Preferably, the sleeve 3 is arranged about a portion of the shaft pin 4 the outer surface of which is tapered, e.g., conical-frustum shaped. In this case, the inner surface of the sleeve 3 is also tapered, e.g., conical-frustum shaped, in particular in a direction opposite to the tapering direction of the surface portion of the shaft pin 4. Preferably, the thickness, parallelly to axis Y, of the sleeve wall 3 is increasing outwardly along the axis X. The axis Y is orthogonal to the axis X.

The shaft pin 4 is adapted to rotate. The sleeve 3 and the shaft pin 4 are fixed to each other, in particular so that the sleeve 3 and the shaft pin 4 are adapted to rotate integrally with each other.

If the sensors 5, 8, 9 are housed in the sleeve 3 the axes J of the holes, or cavities, are preferably perpendicular to the axis X, whereby the sensors are arranged in said holes radially with respect to the axis X.

If the overall dimensions of the sensors used exceed the thickness of the sleeve 3 along the axis Y, it is preferable that the axes J of the holes, or cavities (FIG. 1), are inclined forming an angle other than 90° with respect to the axis X so that the sensors are not arranged radially with respect to the axis X. This solution makes it possible to leave the shaft pin 4 unchanged and modify only the sleeve 3, whereby this solution can be applied in case of retrofitting.

In an alternative example (not shown), said sensors 5, 8, 9 are housed in the rotating component 4 which is, for example, a pin, in particular a shaft pin 4, or end pin 4. In particular, the sleeve 3 is not provided. The oil film is present between the shaft pin 4 and the bushing 2. In particular, the oil film is in contact with the shaft pin 4 and the bushing 2. Again, it is preferable for the axes J of the holes, or cavities, to be perpendicular to the axis X. However, the axes J of the holes, or cavities, can be inclined to form an angle other than 90° with respect to the axis X.

FIG. 1 shows part of a roll 11. The roll 11 has a portion which is adapted to come into contact with the material to be processed.

The roll 11 is provided with two shaft pins 4, or end pins 4, one of which is shown in FIG. 1. The shaft pins 4 are in particular the axial (relative to the axis X) end portions of the roll 11. The aforesaid portion adapted to come into contact with the material to be processed extends between the two shaft pins 4.

Each end pin 4 is supported by a respective chock 1. The static component 2 is housed in each chock 1, in particular in a through hole of each chock 1, and is internally crossed by said at least one rotating component 3, 4.

For each roll 11, the monitoring system can be implemented for both pairs of static component 2 and rotating component 3, 4, opposite to each other relative to a plane perpendicular to the axis X, in particular parallel with respect to the axis Y drawn in FIG. 1. The two monitoring systems implemented for each roll 11 preferably comprise the same components which are preferably arranged symmetrically relative to said plane.

As anticipated above, the invention further relates to a rolling mill stand or continuous roll casting device or coil forming system, wherein each roll 11 has end pins 4 supported by a respective chock 1, wherein a static component 2, crossed internally by at least one rotating component 3, 4, is housed in a through-hole of each chock 1, said static component 2 and said at least one rotating component 3, 4 defining an axis X;

wherein an oil film is arranged between said static component 2 and said at least one rotating component 3, 4;

wherein said at least one rotating component 3, 4 consists of an end pin 4 of a respective roll 11 or a sleeve 3 into which said end pin 4 is inserted;

and wherein a monitoring system of parameters representative of the operating conditions of the oil film, as described above, is provided.

The rolling mill stand, the continuous roll casting device, and the coil forming system each comprise one or more rolls 11.

The invention claimed is:

1. A monitoring system for monitoring parameters representative of operating conditions of an oil film bearing, wherein an oil film is present between a static component and at least one rotating component both defining an axis X, said at least one rotating component being arranged inside said static component and adapted to rotate about said axis X, the monitoring system comprising at least one pressure sensor to detect an oil pressure of said oil film;

at least one distance sensor to detect a distance between said static component and said at least one rotating component and thereby a thickness of said oil film;

at least one temperature sensor to detect a temperature of said oil film;

characterized in that the at least one pressure sensor, the at least one distance sensor and the at least one temperature sensor are housed in said at least one rotating component.

2. The system according to claim 1, wherein the at least one pressure sensor is housed in a first hole or cavity produced in said at least one rotating component; wherein the at least one distance sensor is housed in a second hole or cavity produced in said at least one rotating component; and wherein the at least one temperature sensor is housed in a third hole or cavity produced in said at least one rotating component;

or wherein two of either the at least one pressure sensor, the at least one distance sensor or the at least one temperature sensor are housed in a first hole or cavity produced in said at least one rotating component, and the other one is housed in a second hole or cavity produced in said at least one rotating component;

or wherein the at least one pressure sensor, the at least one distance sensor and the at least one temperature sensor are housed in a single hole or cavity produced in said at least one rotating component.

3. The system according to claim 1, wherein there are provided only one pressure sensor, only one distance sensor and only one temperature sensor arranged along a periphery of said at least one rotating component.

4. The system according to claim 1, wherein there are provided a first row of pressure sensors, a second row of distance sensors and a third row of temperature sensors, each row being arranged along a direction parallel to the axis X.

5. The system according to claim 4, wherein said first row, said second row and said third row are arranged along a periphery of said at least one rotating component.

6. The system according to claim 4, wherein each row comprises two or more sensors.

7. The system according to claim 1, wherein the at least one pressure sensor, the at least one distance sensor and the at least one temperature sensor are connected by means of a respective cable to a digitalization device for digitizing signals generated by the respective sensors.

8. The system according to claim 1, wherein said static component is a bushing, and said at least one rotating component consists of a shaft pin, or a sleeve in which a shaft pin is inserted.

9. The system according to claim 8, wherein said shaft pin is a neck or pin of a roll for use in a rolling mill stand or continuous casting device or coil forming system.

10. The system according to claim 1, wherein the at least one pressure sensor, the at least one distance sensor, and the at least one temperature sensor are powered by means of sliding contacts, batteries, wirelessly, or by means of a device provided with an alternator and a flywheel.

11. The system according to claim 1, wherein the at least one pressure sensor, the at least one distance sensor and the at least one temperature sensor are housed in holes or cavities defining axes J either radial to the axis X or inclined at an angle other than 90° with respect to the axis X.

12. A rolling mill stand wherein each roll has end pins supported by a respective chock, wherein the static component, crossed internally by the at least one rotating component, is housed in a through-hole of each chock, said static component and said at least one rotating component defining the axis X, wherein the oil film is arranged between said static component and said at least one rotating component, wherein said at least one rotating component consists of an end pin of a respective roll or a sleeve into which said end pin is inserted;

and wherein the monitoring system, according to claim 1, is provided for monitoring the parameters representative of the operating conditions of the oil film.

13. A continuous roll casting device, wherein each roll has end pins supported by a respective chock, wherein the static component, crossed internally by the at least one rotating component is housed in a through-hole of each chock, said static component and said at least one rotating component defining the axis X, wherein the oil film is arranged between said static component and said at least one rotating component, wherein said at least one rotating component consists of an end pin of a respective roll or a sleeve into which said end pin is inserted;

and wherein the monitoring system, according to claim 1, is provided for monitoring the parameters representative of the operating conditions of the oil film.

14. A coil forming system, wherein each roll has end pins supported by a respective chock, wherein the static component, crossed internally by the at least one rotating component is housed in a through-hole of each chock, said static component and said at least one rotating component defining the axis X, wherein the oil film is arranged between said static component and said at least one rotating component, wherein said at least one rotating component consists of an end pin of a respective roll or a sleeve into which said end pin is inserted;

and wherein the monitoring system, according to claim 1, is provided for monitoring the parameters representative of the operating conditions of the oil film.

\* \* \* \* \*